United States Patent
Bonacini

(10) Patent No.: US 8,408,273 B2
(45) Date of Patent: Apr. 2, 2013

(54) BEAD BREAKING UNIT FOR TIRE CHANGING MACHINES

(75) Inventor: Maurizio Bonacini, Correggio (IT)

(73) Assignee: Giuliano Group S.p.A, Correggio (RE) (IT)

( * ) Notice: Subject to any disclaimer, the term of this patent is extended or adjusted under 35 U.S.C. 154(b) by 243 days.

(21) Appl. No.: 12/927,656

(22) Filed: Nov. 19, 2010

(65) Prior Publication Data

US 2011/0139377 A1    Jun. 16, 2011

(30) Foreign Application Priority Data

Dec. 16, 2009 (IT) .............................. MO2009A0294

(51) Int. Cl.
*B60C 25/125* (2006.01)
(52) U.S. Cl. ...................................... 157/1.17; 157/1.28
(58) Field of Classification Search ................ 157/1.17, 157/1.24, 1.26, 1.28
See application file for complete search history.

(56) References Cited

U.S. PATENT DOCUMENTS

| | | | | |
|---|---|---|---|---|
| 5,226,465 A | | 7/1993 | Schoen et al. | 157/1.28 |
| 5,381,843 A | * | 1/1995 | Corghi | 157/1.28 |
| 5,669,429 A | * | 9/1997 | Gonzaga | 157/1.24 |
| 7,500,504 B2 | * | 3/2009 | Bonacini | 157/1.17 |
| 7,591,295 B2 | * | 9/2009 | Bonacini | 157/1.17 |
| 2008/0017324 A1 | * | 1/2008 | Bonacini | 157/1.28 |

FOREIGN PATENT DOCUMENTS

| | | |
|---|---|---|
| EP | 1 524 134 | 4/2005 |
| WO | WO 2009/130135 | 10/2009 |

OTHER PUBLICATIONS

Italian Search Report dated Jul. 28, 2010.
European Search Report dated Mar. 18, 2011 in European Patent Application No. EP 10 19 4050.0.

* cited by examiner

*Primary Examiner* — David B Thomas
(74) *Attorney, Agent, or Firm* — Collard & Roe, P.C.

(57) ABSTRACT

The bead breaking unit for tire changing machines includes an arm having a first extremity associated turnable with a support structure and a second extremity having a bead breaking tool, the arm being suitable for oscillating between an away position, wherein the bead breaking tool is positioned substantially at a distance from the support structure, and a work position, wherein the bead breaking tool is positioned substantially close to the support structure, at least an actuator device having a mobile element associated sliding with the arm, at least a drive element for driving the arm, associated with the mobile element and suitable for operating during the movement of the mobile element from an extracted position to a retracted position to move the arm towards the work position and an apparatus of temporary coupling between the mobile element and the arm, suitable for operating during the movement of the mobile element from the retracted position to the extracted position to move the arm from the work position to the away position.

15 Claims, 3 Drawing Sheets

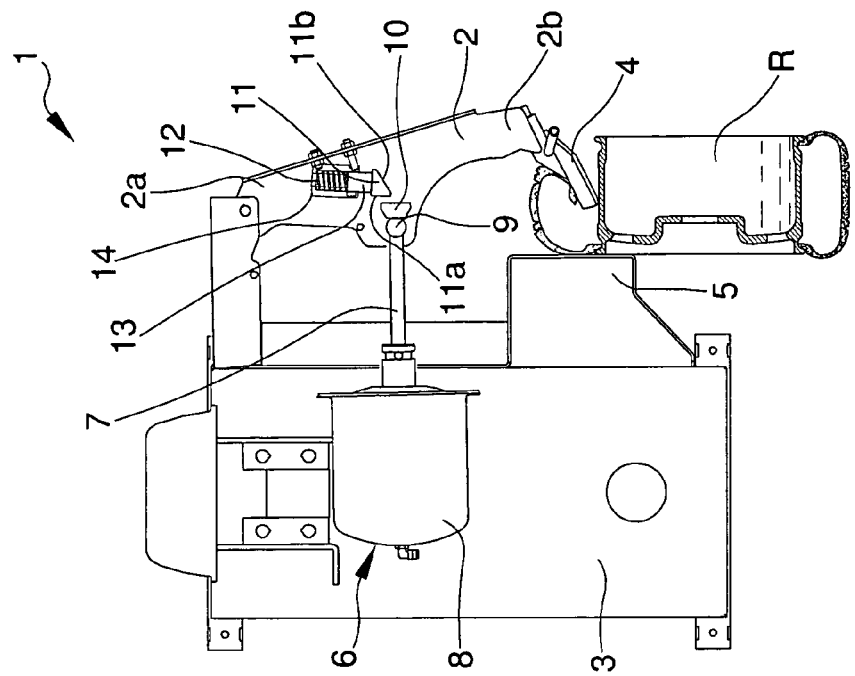
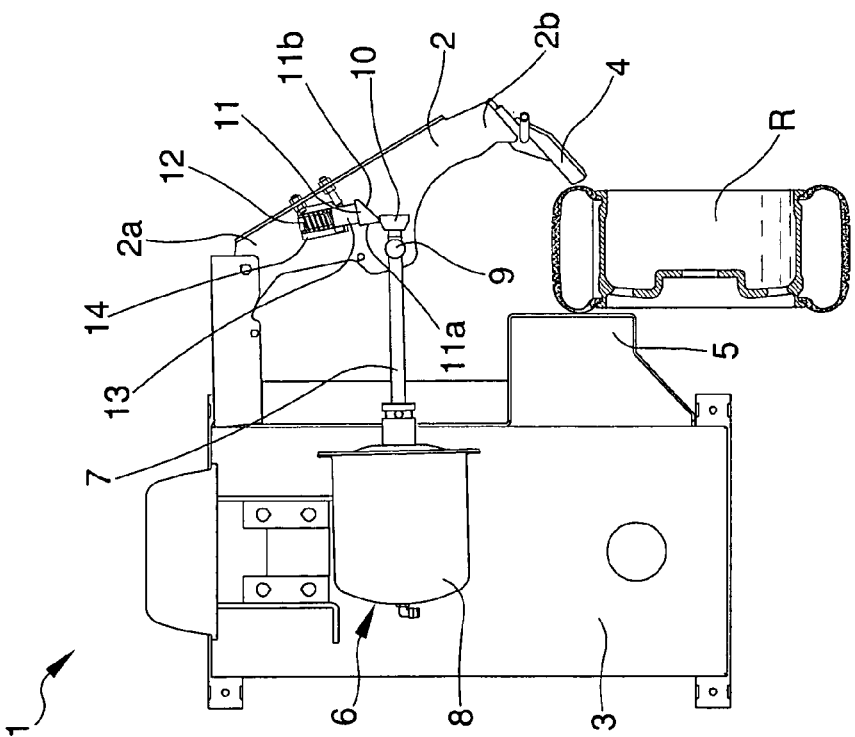
Fig. 3
Fig. 4

BEAD BREAKING UNIT FOR TIRE CHANGING MACHINES

CROSS REFERENCE TO RELATED APPLICATIONS

Applicant claims priority under 35 U.S.C. §119 of Italian Application No. MO2009A000294 filed on Dec. 16, 2009, the disclosure of which is incorporated by reference.

BACKGROUND OF THE INVENTION

1. Field of the Invention

The present invention relates to a bead breaking unit for tire changing machines.

2. Description of the Related Art

Tire changing machines are commonly used for fitting/removing vehicle wheel tires to/from respective rims.

As is known, before being able to completely remove a tire from its housing on the respective rim, it is necessary to detach its beads from the bead retention edges on the rim itself.

This operation is performed by means of a suitable bead breaking unit, normally present on the tire changing machine itself.

Bead breaking units of known type comprise an arm with a first extremity hinged to the bed of the tire changing machine according to a substantially vertical axis and a second extremity having a bead breaking tool, otherwise known as blade.

On the bed is fastened a supporting element, usable to correctly fit the rim during the bead breaking operation.

This contact element has a support surface, otherwise known as pad, which is made of suitable material, and usually knurled in such a way as to increase the friction coefficient with the wheel.

The bead breaking units of known type generally comprise a linear actuator of the type, e.g., of a fluid actuator cylinder for moving the arm.

The liner of the actuator cylinder is hinged to the bed and can be turned around a vertical axis, while the rod is moving between an extracted position and a retracted position and is associated sliding with the arm.

The rod has a drive element which, during movement from the extracted position to the retracted position, is suitable for engaging on the arm to drive it towards the bed.

During use, in an idle position of the bead breaking unit, the cylinder rod is normally extracted and the arm, which can be freely rotated around its hinging axis, is in a closer position with respect to the bed of the tire changing machine due to the action of a return spring.

An operator, once the portion of the wheel to be bead broken has been suitably positioned in correspondence to the pad, manually moves the arm until the blade is positioned in contact with a section of the tire bead.

Subsequently, the operator operates the actuator cylinder, moving the rod from the extracted position to the retracted position.

This way, the arm is driven by the rod and the blade pushes the tire bead, detaching it from the edge of the rim.

Subsequently, the rod of the actuator cylinder is moved to extracted position and the operator manually extracts the blade inserted between tire and rim.

Once the wheel has been removed, the arm is again moved to near position with respect to the bed of the tire changing machine by means of the return spring. The known bead breaking units do however have a number of drawbacks.

In particular, after bead breaking, the extraction operation of the blade inserted between the tire and the rim must be performed manually by the operator.

This requires a far from negligible physical effort by the operator, often repeated several times during the course of a day.

Furthermore, in the frequent case of the blade remaining trapped between the tire bead and the edge of the rim, the job becomes necessary of more than one operator, with the consequent and onerous use of time and personnel.

SUMMARY OF THE INVENTION

The main aim of the present invention is to provide a bead breaking unit for tire changing machines that allows minimizing manual jobs on the part of the operators during the bead breaking operation.

Another object of the present invention is to provide a bead breaking unit for tire changing machines which allows overcoming the mentioned drawbacks of the state of the art within the ambit of a simple, rational, easy and effective to use as well as low cost solution.

The above objects are achieved by the present bead breaking unit for tire changing machines, comprising an arm having a first extremity associated turnable with a support structure and a second extremity having a bead breaking tool, said arm being suitable for oscillating between an away position, wherein said bead breaking tool is positioned substantially at a distance from said support structure, and a work position, wherein said bead breaking tool is positioned substantially close to said support structure, at least an actuator device having at least a mobile element associated sliding with said arm, at least a drive element for driving said arm, associated with said mobile element and suitable for operating during the movement of said mobile element from an extracted position to a retracted position to move said arm towards said work position and at least an apparatus of temporary coupling between said mobile element and said arm, suitable for operating during the movement of said mobile element from said retracted position to said extracted position to move said arm from said work position to said away position.

BRIEF DESCRIPTION OF THE DRAWINGS

Other characteristics and advantages of the present invention will become more evident from the description of a preferred, but not sole, embodiment of a bead breaking unit for tire changing machines, illustrated purely as an example but not limited to the annexed drawings in which:

FIGS. 2 to 6 are plan views that show the operation of the bead breaking unit according to the invention.

DETAILED DESCRIPTION OF THE PREFERRED EMBODIMENTS

Figure 2:
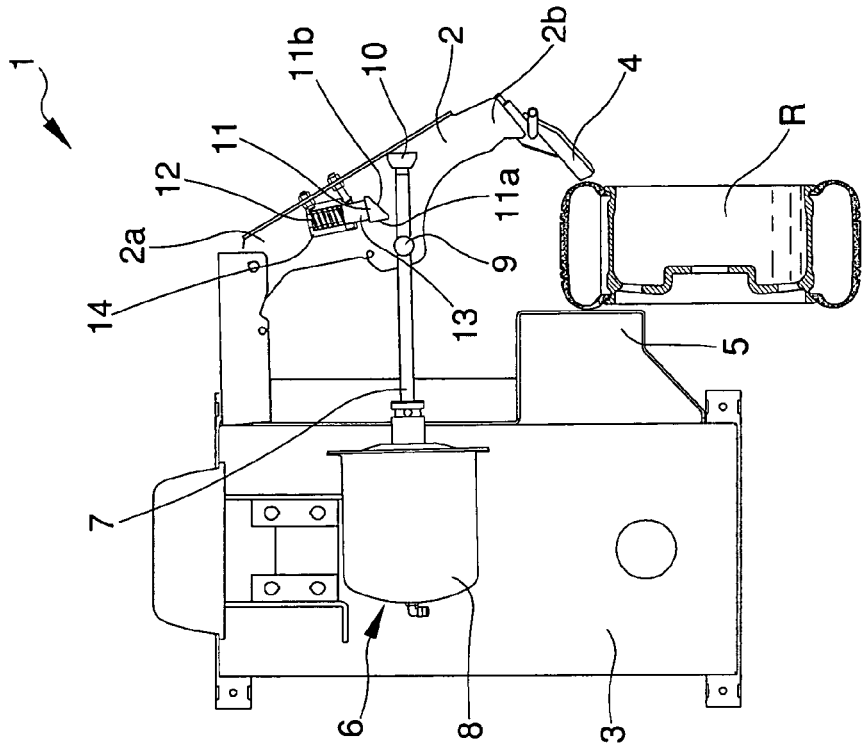

With particular reference to such figures, globally indicated by 1 is a bead breaking unit which can be fitted on tire changing machines of known type and usable for the first detachment of the tire bead from the respective rim of a wheel, before the fitting/removing operation of the tire itself.

The bead breaking unit 1 comprises an arm 2 with a first extremity 2a hinged to a support structure 3 and turnable around a substantially vertical hinging axis, and a second extremity 2b having a bead breaking tool 4 of the type, e.g., of a conventional blade or the like.

The support structure 3 can be made up, e.g., of the bed itself of the tire changing machine.

On the support structure 3 is fixed a supporting element 5, also called pad, usable for the correct positioning of a wheel R to be bead broken.

The arm 2 is suitable for swinging between an away position, wherein the bead breaking tool 4 is placed substantially at a distance from the supporting element 5, and a work position, wherein the bead breaking tool 4 is placed substantially close to the supporting element 5 and is suitable for pressing on the tire of a wheel R to be bead broken.

At least an elastic return element, not shown in the figures inasmuch as of known type, is placed between the support structure 3 and the arm 2 and operate to bring back the arm 2 from the away position to the work position.

The bead breaking unit 1 also comprises an actuator device 6 having a mobile element 7 associated sliding with the arm 2 and moving between an extracted position and a retracted position.

In particular, with non-restricted reference to the embodiment of the bead breaking unit 1 shown in the illustrations, the actuator device 6 is composed of a linear actuator, of the type of a fluid actuator cylinder or the like.

The linear actuator 6 has a fixed portion 8, made up of the liner of the linear actuator itself, hinged to the support structure 3 and which can be turned around a substantially vertical axis. The mobile element 7 is made up of the mobile rod of the linear actuator 6.

The rod 7, in particular, is sustained axially sliding by a sliding support element on the arm 2, schematically shown in the illustrations and indicated with the reference 9, and is moving between the retracted position, wherein it is partially housed inside the liner 8, and the extracted position, wherein it is completely extended from the liner 8.

The rod 7 has a drive element 10 of the arm 2, suitable for intervening during the movement of the rod itself from the extracted position to the retracted position to move the arm 2 towards the work position.

With particular but not exclusive reference to the embodiment of the bead breaking unit 1 shown in the figures, the drive element 10 is made up of a head with substantially widened shape fastened to the free extremity of the rod 7 and suitable for engaging on the sliding support element 9 during the movement of the rod itself from the extracted position to the retracted position.

Different embodiments of the drive element 10 cannot however be ruled out. Advantageously, the bead breaking unit 1 comprises an apparatus of temporary coupling between the rod 7 and the arm 2, suitable for intervening during the movement of the rod itself from the retracted position to the extracted position. In particular, the apparatus of temporary coupling allows using the rod 7, during the movement from the retracted position to the extracted position, to move the arm from the work position to the away position.

This allows automatically extracting the bead breaking tool which, after the bead breaking operation, is inserted between the tire and the rim of the wheel R. In particular, the apparatus of temporary coupling comprises a drive element 10 associated integral with the rod 7 and a contact element 11 associated with the arm 2.

The drive element 10 is suitable for engaging on the contact element 11 during the movement of the rod 7 from the retracted position to the extracted position. Usefully, the drive element 10 is made up of the same head used to drive the arm 2 towards the work position.

The contact element 11 is moving between an operating position, wherein it is arranged along the trajectory of the drive element 10, and a disengagement position, wherein it is substantially away from the trajectory of the drive element 10.

The above apparatus of temporary coupling also comprises a contrast elastic element 12, of the type of a thrust spring or the like, suitable for contrasting the movement of the contact element 11 from the operating position to the disengagement position.

Usefully, the apparatus of temporary coupling comprises a guide device for guiding the movement of the contact element 11 between the operating position and the disengagement position.

In particular, this guide device comprises a sliding element 13, supporting the contact element 11, associated sliding with a rectilinear guide element 14 fixed to the arm 2.

With particular reference to the embodiment shown in the illustrations, the sliding element 13 is made up of a pin 13 having at an extremity the contact element 11, while the rectilinear guide element 14 is made up of a support 14 fastened to the arm 2 and having a seat that houses the pin 13 axially sliding.

The thrust spring 12 is fitted inside the seat of the support 14, around the pin 13, and operates to move the contact element 11 to the operating position.

Usefully, the contact element 11 has a first contact surface 11a which, when the arm 2 is in work position, is substantially at right angles with respect to the trajectory of the drive element 10.

The first contact surface 11a is suitable for being engaged by the drive element 10 during the movement of the rod 7 from the retracted position to the extracted position, to move the arm 2 from the work position to the away position.

The contact element 11 also comprises a second contact surface 11b which, when the arm 2 is in work position, is substantially sloped with respect to the trajectory of the drive element 10.

The second contact surface 11b is suitable for being engaged by the drive element 10 during the movement of the rod 7 from the extracted position to the retracted position, for the movement of the contact element 11 from the operating position to the disengagement position.

In particular, the contact element 11 is substantially wedge-shaped and the first contact surface 11a and the second contact surface 11b are defined on faces substantially opposite one another.

Figure 1:
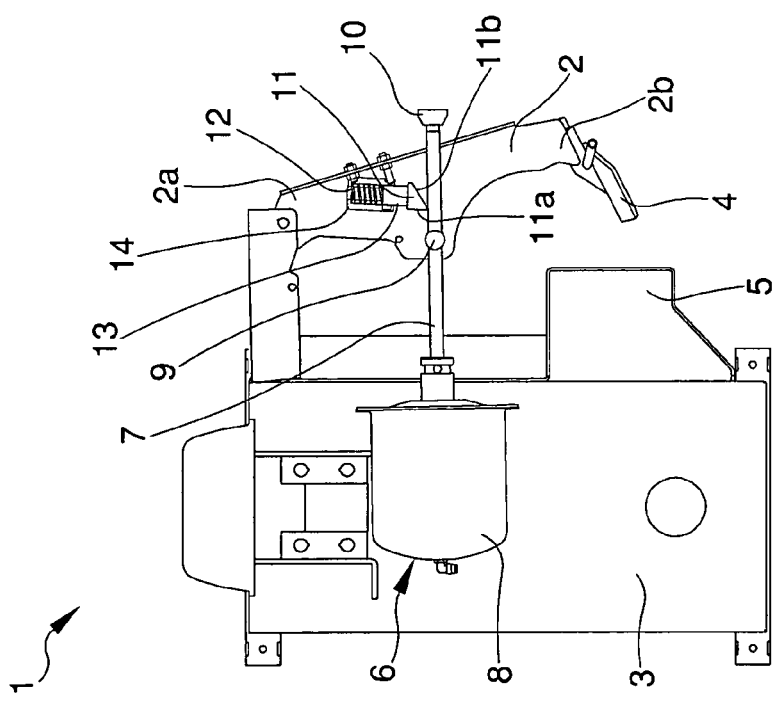
FIG. 1 is a plan view of the bead breaking unit according to the invention.

When the bead breaking unit 1 is not used, the rod 7 of the linear actuator 6 is in the extracted position and, in this configuration, the arm 2 is free to turn around its hinging axis (FIG. 1).

During use, first of all an operator positions a wheel R to be bead broken in correspondence to the supporting element 5 and manually moves the arm 2 so as to position the bead breaking tool 4 in correspondence to a section of the tire of the wheel R (FIG. 2).

Subsequently, the operator operates the linear actuator 6 and the rod 7 moves from the extracted position to the retracted position.

During such movement, the drive element 10 moves into contact with the contact element 11 and engages on the second contact surface 11b, moving the contact element itself from the operating position to the disengagement position (FIG. 3).

Once the drive element 10 has passed beyond the contact element 11, this is returned to the operating position by means of the thrust spring 12.

Subsequently, the drive element 10 engages on the sliding support element 9, driving the arm 2 towards the work position.

Consequently, the bead breaker tool 4 presses on the tire of the wheel R, until the bead is moved away from the edge of the rim (FIG. 4).

The rod 7 is then moved from the retracted position to the extracted position and, during such movement, the drive element 10 engages on the first contact surface 11a of the contact element 11.

Figure 5:
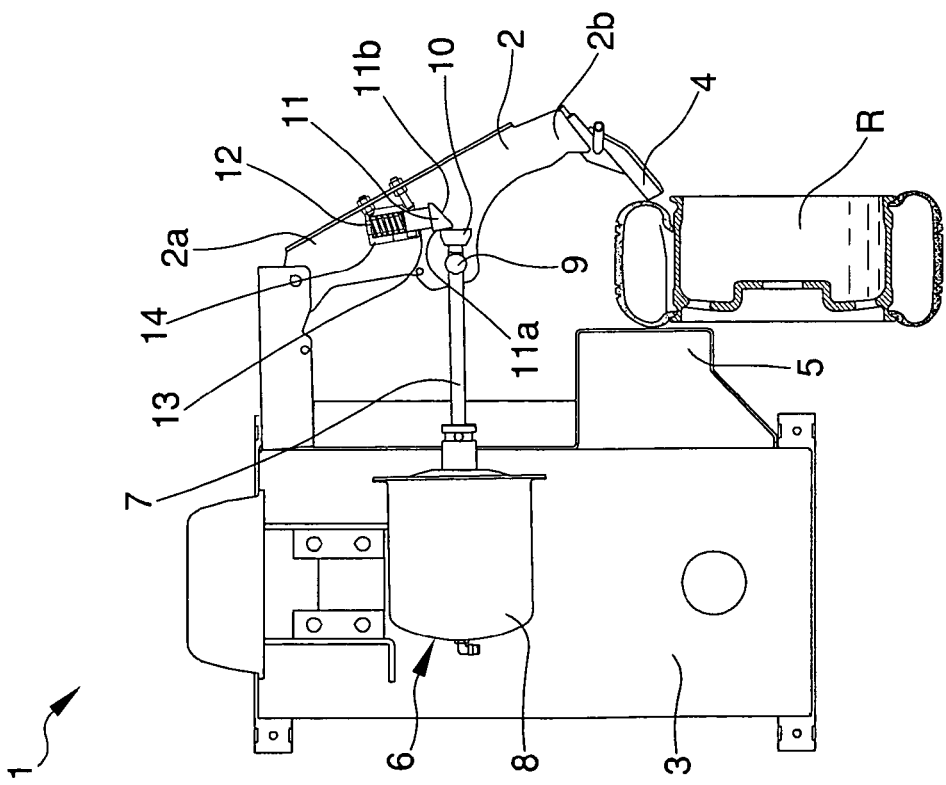

Consequently, the arm 2 is pushed towards the away position and the bead breaking tool 4 is extracted and moved away from the wheel R (FIG. 5).

Figure 6:
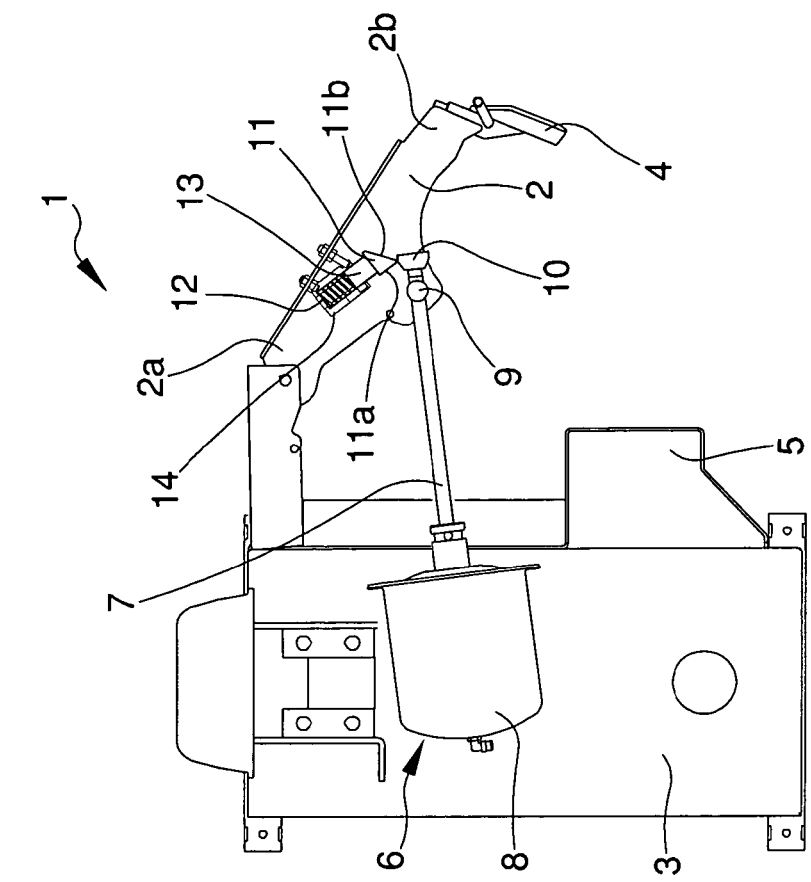

Finally, when the rod 7 reaches the extracted position, the drive element 10 passes beyond the contact element (FIG. 6) and the arm 2 is returned to the work position by means of the return elastic element (FIG. 1).

It has in point of fact been ascertained how the described invention achieves the proposed objects.

In particular, the fact is underlined that the apparatus of temporary coupling between the rod of the linear actuator and the arm allows automating the extraction operation of the bead breaking tool from the wheel, following the bead breaking operation.

This allows considerably reducing the manual jobs and the physical efforts of the operators during bead breaking and, furthermore, allows easily freeing the bead breaking tool in case of this remaining trapped between the tire and the edge of the rim.

The invention claimed is:

1. A bead breaking unit for tire changing machines, comprising an arm having a first extremity associated turnable with a support structure and a second extremity having a bead breaking tool, said arm being suitable for oscillating between an away position, wherein said bead breaking tool is positioned substantially at a distance from said support structure, and a work position, wherein said bead breaking tool is positioned substantially close to said support structure, at least an actuator device having at least a mobile element associated sliding with said arm, at least a drive element for driving said arm, associated with said mobile element and suitable for operating during the movement of said mobile element from an extracted position to a retracted position to move said arm towards said work position and at least an apparatus of temporary coupling between said mobile element and said arm, suitable for operating during the movement of said mobile element from said retracted position to said extracted position to move said arm from said work position to said away position.

2. The bead breaking unit according to the claim 1, wherein said apparatus of temporary coupling comprises at least the drive element associated with said mobile element and at least a contact element associated with said arm, said drive element being suitable for engaging on said contact element during the movement of said mobile element from said retracted position to said extracted position to move said arm from said work position to said away position.

3. The bead breaking unit according to claim 2, wherein said contact element is mobile between an operating position, wherein it is arranged along the trajectory of said drive element, and a disengagement position, wherein it is substantially moved away from the trajectory of said drive element.

4. The bead breaking unit according to claim 3, wherein said apparatus of temporary coupling comprises at least a contrast elastic element suitable for contrasting the movement of said contact element from said operating position to said disengagement position.

5. The bead breaking unit according to claim 4, wherein said apparatus of temporary coupling comprises at least a guide device for guiding the movement of said contact element between said operating position and said disengagement position.

6. The bead breaking unit according to claim 5, wherein said guide device comprises at least a sliding element for supporting said contact element and at least a rectilinear guide element associated with said arm, said sliding element being associated sliding with said guide element by interposition of said contrast elastic element.

7. The bead breaking unit according to claim 3, wherein said contact element comprises at least a first contact surface a substantially at right angles to the trajectory of said drive element when said arm is in said work position, said first contact surface being suitable for being engaged by said drive element during the movement of said mobile element from said retracted position to said extracted position, for the movement of said arm towards said away position.

8. The bead breaking unit according to claim 7, wherein said contact element comprises at least a second contact surface substantially sloped with respect to the trajectory of said drive element, said second contact surface being suitable for being engaged by said drive element during the movement of said mobile element from said extracted position to said retracted position, for the movement of said contact element towards said disengagement position.

9. The bead breaking unit according to claim 8 wherein said first contact surface and said second contact surface are defined on substantially opposite faces of said contact element.

10. The bead breaking unit according to claim 2, wherein said contact element is substantially wedge-shaped.

11. The bead breaking unit according to claim 1, wherein said actuator device comprises at least a linear actuator.

12. The bead breaking unit according to claim 11, wherein said linear actuator comprises at least a fixed portion associated turnable with said support structure.

13. The bead breaking unit according to claim 11, wherein said mobile element is made up of at least a mobile rod of said linear actuator.

14. The bead breaking unit according to claim 13, wherein said arm comprises at least a sliding support element of said rod.

15. The bead breaking unit according to claim 13, wherein said drive element comprises at least a head with substantially widened shape associated integral with the free extremity of said rod.

* * * * *

UNITED STATES PATENT AND TRADEMARK OFFICE
CERTIFICATE OF CORRECTION

PATENT NO. : 8,408,273 B2  
APPLICATION NO. : 12/927656  
DATED : April 2, 2013  
INVENTOR(S) : Bonacini It is certified that error appears in the above-identified patent and that said Letters Patent is hereby corrected as shown below:

In the Claims, in Column 6, line 21, (Claim 7) please delete: "a".

Signed and Sealed this
Eighteenth Day of June, 2013

Teresa Stanek Rea
*Acting Director of the United States Patent and Trademark Office*